US008840999B2

(12) United States Patent
Harimoto et al.

(10) Patent No.: US 8,840,999 B2
(45) Date of Patent: Sep. 23, 2014

(54) SILICONE COMPOSITION AND A METHOD FOR PREPARING THE SAME

(75) Inventors: Yukinari Harimoto, Handano (JP); Bizhong Zhu, Midland, MI (US)

(73) Assignees: Dow Corning Toray Company, Ltd., Chiyoda-Ku, Tokyo (JP); Dow Corning Corporation, Midland, MI (US)

( * ) Notice: Subject to any disclaimer, the term of this patent is extended or adjusted under 35 U.S.C. 154(b) by 643 days.

(21) Appl. No.: 13/129,926

(22) PCT Filed: Nov. 18, 2009

(86) PCT No.: PCT/US2009/064969
§ 371 (c)(1),
(2), (4) Date: May 18, 2011

(87) PCT Pub. No.: WO2010/059710
PCT Pub. Date: May 27, 2010

(65) Prior Publication Data
US 2011/0223421 A1 Sep. 15, 2011

Related U.S. Application Data

(60) Provisional application No. 61/115,979, filed on Nov. 19, 2008.

(51) Int. Cl.
| | |
|---|---|
| *B32B 17/10* | (2006.01) |
| *C08L 83/04* | (2006.01) |
| *C08K 3/22* | (2006.01) |
| *C08K 9/08* | (2006.01) |
| *C09C 1/30* | (2006.01) |
| *C09C 3/12* | (2006.01) |
| *C09C 1/36* | (2006.01) |
| *C09C 1/00* | (2006.01) |
| *C09C 1/40* | (2006.01) |
| *C08G 77/00* | (2006.01) |
| *C08G 77/12* | (2006.01) |
| *C08G 77/20* | (2006.01) |

(52) U.S. Cl.
CPC .................. *C09C 1/00* (2013.01); *C09C 1/3081* (2013.01); *C09C 3/12* (2013.01); *C09C 1/3684* (2013.01); *C08G 77/70* (2013.01); *C08L 83/04* (2013.01); *C09C 1/407* (2013.01); *C08K 9/08* (2013.01); *C08G 77/12* (2013.01); *C08G 77/20* (2013.01)
USPC ........... 428/428; 428/429; 523/209; 524/430; 524/500

(58) Field of Classification Search
USPC ............ 428/428, 429; 523/209; 524/430, 500
See application file for complete search history.

(56) References Cited

U.S. PATENT DOCUMENTS

| | | |
|---|---|---|
| 4,504,555 A | 3/1985 | Prior et al. |
| 5,112,885 A | 5/1992 | Inoue et al. |

(Continued)

FOREIGN PATENT DOCUMENTS

| | | |
|---|---|---|
| CZ | 278311 B6 | 11/1993 |
| EP | 0936250 A2 | 8/1999 |

(Continued)

OTHER PUBLICATIONS

English language abstract and translation for JP 2001-279099 extracted from the PAJ database on Nov. 4, 2011, 16 pages.

(Continued)

*Primary Examiner* — D. S. Nakarani
(74) *Attorney, Agent, or Firm* — Howard & Howard Attorneys PLLC

(57) ABSTRACT

A silicone composition comprises (a) a curable silicone resin, (b) an inorganic particle having a polymeric surface coating formed thereon, and (c) a cross-linking compound. The (a) curable silicone resin comprises units having a functional group R1 selected from an aryl group, an alkyl group, an alkenyl group, and hydrogen. The polymeric surface coating comprises an organopolysiloxane. The organopolysiloxane comprises units selected from $R^2{}_3SiO_{1/2}$, $R^2{}_2SiO_{2/2}$, $R^2SiO_{3/2}$, and combinations thereof. $R^2$ is selected from an aryl group, an alkyl group, an alkenyl group, hydrogen, and combinations thereof, and $R^1$ equals $R^2$. The (c) cross-linking compound is reactive with at least one of (a) and the polymeric surface coating.

25 Claims, 3 Drawing Sheets

(56) References Cited

U.S. PATENT DOCUMENTS

| | | | |
|---|---|---|---|
| 6,069,201 A | 5/2000 | Okinoshima et al. | |
| 6,084,002 A | 7/2000 | Nicholson et al. | |
| 6,376,603 B1 | 4/2002 | Kashiwagi | |
| 6,384,125 B1 | 5/2002 | Bergstrom et al. | |
| 6,509,423 B1 | 1/2003 | Zhu | |
| 6,646,039 B2 | 11/2003 | Li et al. | |
| 6,689,859 B2 | 2/2004 | Li et al. | |
| 6,750,273 B2 | 6/2004 | Chao | |
| 7,037,592 B2 | 5/2006 | Zhu et al. | |
| 7,122,253 B2 * | 10/2006 | Yamaguchi et al. | 428/447 |
| 7,381,470 B2 | 6/2008 | Suto et al. | |
| 7,713,626 B2 | 5/2010 | Meyer et al. | |

FOREIGN PATENT DOCUMENTS

| | | |
|---|---|---|
| EP | 1065248 A1 | 1/2001 |
| EP | 1074574 A1 | 2/2001 |
| FR | 2575407 A1 | 7/1986 |
| GB | 805102 | 11/1958 |
| JP | 59223365 A | 12/1984 |
| JP | H 03-072568 A | 3/1991 |
| JP | 2001-279099 | 10/2001 |
| JP | 2004-231885 | 8/2004 |
| TW | 200736342 A | 10/2007 |
| WO | WO 81/03496 A1 | 12/1981 |
| WO | WO 00/46817 A1 | 8/2000 |
| WO | WO 01/18121 A1 | 3/2001 |
| WO | WO 03/104329 A1 | 12/2003 |
| WO | WO 2004/048266 A1 | 6/2004 |
| WO | WO 2005/068569 A1 | 7/2005 |
| WO | WO 2007/120197 A2 | 10/2007 |

OTHER PUBLICATIONS

English language abstract and translation for JP 2004-231885 extracted from the PAJ database on Nov. 4, 2011, 35 pages.

English language abstract for WO 03/104329 extracted from the espacenet.com database on Nov. 4, 2011, 36 pages.

English language abstract for CZ 278311 extracted from the espacenet.com database on Nov. 8, 2011, 9 pages.

No English language abstract available for FR 2575407. However, see English language translation extracted from the EPO Machine Translator, 33 pages.

International Search Report for Application No. PCT/US2009/064969 dated Jan. 25, 2010, 4 pages.

English language abstract for TW 200736342 provided by Lee and Li on Jun. 10, 2014, 1 page.

English language abstract for JPH 03-072568 extracted from espacenet.com database on Jul. 28, 2014, 2 pages.

* cited by examiner

SILICONE COMPOSITION AND A METHOD FOR PREPARING THE SAME

RELATED APPLICATIONS

This application claims priority to and all the advantages of International Patent Application No. PCT/US2009/064969, filed on Nov. 18, 2009, which claims priority to U.S. Provisional Patent Application No. 61/115,979, filed on Nov. 19, 2008.

BACKGROUND OF THE INVENTION

1. Field of the Invention

The subject invention generally relates to a silicone composition and a method for preparing the silicone composition. More specifically, the subject invention relates to a silicone composition which comprises a curable silicone resin, an inorganic particle having a polymeric surface coating, and a cross-linking compound, and which exhibits transparency when cured.

2. Description of the Related Art

Silicones are useful in a variety of applications by virtue of their unique combination of properties, including high thermal stability, good moisture resistance, excellent flexibility, high ionic purity, low alpha particle emissions, and good adhesion to various substrates. In particular, silicone compositions containing reinforcing fillers, such as inorganic particles, are commonly employed in applications requiring exceptional mechanical properties and adhesiveness. For example, filled silicone compositions are widely used in the automotive, electronic, construction, appliance, and aerospace industries.

Silicone compositions containing treated inorganic particles are known in the art. For example, many existing silicone compositions contain colloidal silica treated with an organosilane compound. However, many existing treated inorganic particles are incompatible with one or more components in the silicone compositions, which contributes to inadequate mixing and, ultimately, inadequate reinforcement of the silicone compositions. Further, many existing treated inorganic particles are treated with organosilane compounds that contribute to haziness of the silicone compositions upon curing. That is, when cured, many existing silicone compositions do not exhibit transparency in the wavelength from 300 nm to 800 nm, i.e., the visible spectrum, especially when, for reinforcement purposes, the silicone composition is filled to greater than or equal to 70 parts by weight of the treated inorganic particle based on 100 parts by weight of the silicone composition.

Consequently, there is a need for silicone compositions that do not suffer from the aforementioned inadequacies.

SUMMARY OF THE INVENTION AND ADVANTAGES

The subject invention provides a silicone composition comprising (a) a curable silicone resin, (b) an inorganic particle having a polymeric surface coating formed thereon, and (c) a cross-linking compound. The (a) curable silicone resin comprises units having a functional group $R^1$ selected from an aryl group, an alkyl group, an alkenyl group, and hydrogen. The polymeric surface coating of the (b) inorganic particle comprises an organopolysiloxane. The organopolysiloxane comprises units selected from $R^2_3SiO_{1/2}$, $R^2_2SiO_{2/2}$, $R^2SiO_{3/2}$, and combinations thereof, wherein $R^2$ is selected from an aryl group, an alkyl group, an alkenyl group, and hydrogen. $R^1$ equals $R^2$, such that when $R^1$ is the aryl group, $R^2$ is also the aryl group, when $R^1$ is the alkyl group, $R^2$ is also the alkyl group, when $R^1$ is the alkenyl group, $R^2$ is also the alkenyl group, and when $R^1$ is hydrogen, $R^2$ is also hydrogen. The (c) cross-linking compound is reactive with at least one of the (a) curable silicone resin and the polymeric surface coating of the (b) inorganic particle.

The subject invention also provides a composite article comprising an adhesive silicone layer and a substrate formed from a vitreous material. The adhesive silicone layer is formed from the silicone composition and is disposed adjacent to and in contact with the substrate. Additionally, the subject invention provides a method for preparing the silicone composition comprising the steps of providing the (a) curable silicone resin, providing the (b) inorganic particle, providing the (c) cross-linking compound, forming the polymeric surface coating on the (b) inorganic particle, and mixing components (a), (b), and (c) to prepare the silicone composition.

The method of the subject invention advantageously provides for in-situ formation of the polymeric surface coating on the (b) inorganic particle, which results in excellent uniformity and a thicker surface coating as compared to existing methods. Further, the in-situ formation of the polymeric surface coating allows for reduced production costs by way of fewer processing steps as compared to existing methods for preparing a silicone composition. Moreover, the composite article of the subject invention unexpectedly has an excellent transparency in the wavelength from 300 nm to 800 nm, i.e., the visible spectrum, as measured in accordance with ASTM D1746-97, even when the silicone composition of the subject invention comprises greater than or equal to 50 parts by weight of the (b) inorganic particle based on 100 parts by weight of the silicone composition.

BRIEF DESCRIPTION OF THE DRAWINGS

Other advantages of the present invention will be readily appreciated, as the present invention becomes better understood by reference to the following detailed description when considered in connection with the accompanying drawings wherein.

DETAILED DESCRIPTION OF THE INVENTION

Figure 1A:
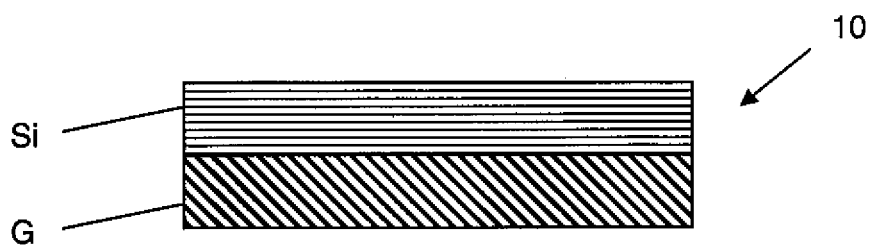
FIG. 1A is a cross-sectional view of a composite article comprising a substrate and an adhesive silicone layer.

Referring to FIGS. 1A-1E, the subject invention includes a silicone composition, a composite article 10 comprising an adhesive silicone layer Si formed from the silicone composition, and a method for preparing the silicone composition. The silicone composition is typically used as an adhesive in conjunction with a substrate for fire-rated glass. However, it is to be appreciated that the silicone composition of the subject invention can have many applications beyond fire-rated glass, including, but not limited to, high-temperature packaging materials and electronic devices.

The silicone composition comprises (a) a curable silicone resin comprising units having a functional group $R^1$. $R^1$ is selected from an aryl group, an alkyl group, an alkenyl group, and hydrogen. Suitable aryl groups include phenyl, tolyl, xylyl, and naphthyl, and suitable alkyl groups include methyl, ethyl, propyl, isopropyl, n-butyl, isobutyl, and pentyl. Suitable alkenyl groups include vinyl, allyl, and propenyl. It is to be appreciated that other aryl groups, alkyl groups, and alkenyl groups not recited herein may also be suitable for the purposes of the subject invention. In one embodiment, $R^1$ is an aryl group, e.g. a phenyl group. In another embodiment, $R^1$ is an alkenyl group, e.g. a vinyl group. The functional group $R^1$ may be in any suitable molecular position, e.g., pendant and/or terminal, but is typically in a terminal position to afford excellent compatibility with other components of the silicone composition, as set forth in more detail below.

The (a) curable silicone resin typically has units selected from $R^1{}_3SiO_{1/2}$, $R^1{}_2SiO_{2/2}$, $R^1SiO_{3/2}$, and combinations thereof. That is, according to general nomenclature known in the art, the (a) curable silicone resin has units selected from M units, i.e., monofunctional units; D units, i.e., difunctional units; T units, i.e., trifunctional units; and combinations thereof.

As used herein, the terminology "curable silicone resin" refers to resins comprising silicone that can be cured, i.e., cross-linked, to form a reaction product having a solid form. In one embodiment, the reaction product is useful as an adhesive. Generally, curable silicone resins and methods of preparing curable silicone resins are known in the art. For the purposes of the subject invention, the (a) curable silicone resin may be selected from a peroxide-curable silicone resin, a condensation-curable silicone resin, an epoxy-curable silicone resin, an ultraviolet radiation-curable silicone resin, and a high-energy radiation-curable silicone resin. The (a) curable silicone resin may also be a hydrosilylation-curable silicone resin, as set forth in more detail below.

A suitable peroxide-curable silicone resin is typically cured by a reaction between (i) an organopolysiloxane and (ii) an organic peroxide. Organopolysiloxanes are known in the art and are generally described as silicone polymers having a reactive organic group. Methods of producing organopolysiloxanes are also known in the art and typically include hydrolyzing organosiloxanes and/or organosilanes to produce hydrolyzates and polymerizing the hydrolyzates to produce organopolysiloxanes. The organosiloxanes may be disiloxanes, trisiloxanes, or polysiloxanes. One example of a suitable organosilane that typically undergoes hydrolysis to form the organopolysiloxane is an alkoxysilane, such as trimethoxysilane.

Suitable organopolysiloxanes for the purposes of the subject invention typically include reactive pendant and/or terminal reactive organic groups. Examples of such suitable reactive organic groups for organopolysiloxanes include, but are not limited to, aryl, alkyl, alkenyl, and hydrogen.

Examples of organic peroxides include, but are not limited to, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

A suitable condensation-curable silicone resin is typically cured by a condensation reaction between (i) an organopolysiloxane containing an average of at least two hydroxy groups per molecule and (ii) a tri- or tetra-functional silane containing hydrolysable Si—O or Si—N bonds. Suitable organopolysiloxanes include those set forth above with the proviso that the organopolysiloxane contains an average of at least two hydroxy groups per molecule. The hydroxy groups may be the same or different and typically have from 2 to 10 carbon atoms. Further, the hydroxy groups may be located at any suitable molecular position, including, but not limited to, terminal, pendant, or both terminal and pendant positions.

Examples of tri- or tetra-functional silanes include, but are not limited to, alkoxysilanes such as $CH_3Si(OCH_3)_3$, $CH_3Si(OCH_2CH_3)_3$, $CH_3Si(OCH_2CH_2CH_3)_3$, $CH_2Si[O(CH_2)_3CH_3]_3$, $CH_3CH_2SI(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_2CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_3)_3$, $C_6H_5Si(OCH_2CH_3)_3$, $C_6H_5Si(OCH_2CH_2OCH_3)_3$, $Si(OCH_3)_4$, $Si(OC_2H_5)_4$, and $Si(OC_3H_7)_4$; oganoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; aminosilanes such as $CH_3Si[NH(s-C_4H_9)]_3$ and $CH_3Si(NHC_6H_{11})_3$; and organoaminooxysilanes.

The condensation reaction may also be catalyzed by a condensation catalyst that accelerates the condensation reaction. Examples of condensation catalysts include, but are not limited to, amines; and complexes of lead, tin, zinc, titanium, zirconium, bismuth, and iron with carboxylic acids. Tin(II) octoates, laureates, and oleates, as well as the salts of dibutyl tin, are particularly useful.

A suitable epoxy-curable silicone resin is typically cured by a reaction between (i) an organopolysiloxane containing an average of at least two epoxy-functional groups per molecule and (ii) a curing agent. Examples of epoxy-functional groups include, but are not limited to, 2-glycidoxyethyl, 3-glycidoxypropyl, 4-glycidoxybutyl, 2,(3,4-epoxycyclohexyl)ethyl, 3-(3,4-epoxycyclohexyl)propyl, 2,3-epoxypropyl, 3,4-epoxybutyl, and 4,5-epoxypentyl. The epoxy-functional groups may be the same or different and typically have from 2 to 10 carbon atoms. Further, the epoxy-functional groups may be located at any suitable molecular position, including, but not limited to, terminal, pendant, or both terminal and pendant positions.

Examples of curing agents include, but are not limited to, anhydrides such as phthalic anhydride, hexahydrophthalic anhydride, tetrahydrophthalic anhydride, and dodecenylsuccinic anhydride; polyamines such as diethylenetriamine, triethylenetetramine, diethylenepropylamine, N-(2-hydroxyethyl)diethylenetriamine, N,N'-di(2-hyrodxyethyl) diethylenetriamine, m-phenylenediamine, methylenedianiline, aminoethyl piperazine, 4,4-diaminodiphenyl sulfone, benzyldimethylamine, dicyandiamide, 2-methylimidazole, and triethylamine; Lewis acids such as boron trifluoride monoethylamine; polycarboxylic acids; polymercaptans; polyamides; and amiodamines.

A suitable ultraviolet radiation-curable silicone resin is typically cured by a reaction between (i) an organopolysiloxane containing radiation-sensitive functional groups and (ii) a photoinitiator. Examples of radiation-sensitive functional groups include, but are not limited to, acryloyl, methacryloyl, mercapto, epoxy, and alkenyl ether groups. The radiation-sensitive functional groups may be located at any suitable molecular position, including, but not limited to, terminal, pendant, or both terminal and pendant positions. The type of photoinitiator typically depends on the nature of the radiation-sensitive groups in the organopolysiloxane. Examples of photoinitiators include, but are not limited to, diaryliodonium salts, sulfonium salts, acetophenone, benzophenone, and benzoin and its derivatives.

A suitable high-energy radiation-curable silicone resin is typically cured by a reaction between (i) an organopolysiloxane polymer and (ii) high-energy radiation. Examples of organopolysiloxane polymers include polydimethylsiloxanes, poly(methylvinylsiloxanes), and organohydrogenpolysiloxanes. Examples of high-energy radiation include γ-rays and electron beams. It is to be appreciated that other organopolysiloxane polymers and examples of high-energy radiation not recited herein may also be suitable for the purposes of the subject invention.

Alternatively, the (a) curable silicone resin may be a hydrosilylation-curable silicone resin. A suitable hydrosilylation-curable silicone resin is typically cured by a reaction between (i) an organopolysiloxane containing an average of at least two silicon-bonded alkenyl groups per molecule, (ii) an organohydrogensiloxane containing an average of at least two silicon-bonded hydrogen atoms per molecule in an amount sufficient to cure the composition, and (iii) a hydrosilylation catalyst.

The hydrosilylation-curable silicone resin typically comprises units represented by the average formula $R^1_a SiO_{(4-a)/2}$. $R^1$ is as defined above and a is a positive number that satisfies $0.5 \leq a < 2.5$, with the proviso that the hydrosilylation-curable silicone resin has at least two silicon-bonded alkenyl groups per molecule. The alkenyl groups may be the same or different and typically have from 2 to 10 carbon atoms. Further, the alkenyl groups may be located at terminal, pendant, or both terminal and pendant positions.

The hydrosilylation catalyst can be any known hydrosilylation catalyst. The hydrosilylation catalyst typically includes a platinum group metal, a compound containing a platinum group metal, or a microencapsulated platinum group metal-containing catalyst. Platinum group metals include, but are not limited to, platinum, rhodium, ruthenuium, palladium, osmium, and iridium. The platinum group metal is typically platinum since platinum has optimal activity in hydrosilylation reactions.

The (a) curable silicone resin is typically present in the silicone composition in an amount of from 5 to 95, more typically 40 to 80 parts by weight based on 100 parts by weight of the silicone composition. When the (a) curable silicone resin is present in the silicone composition in an amount less than 5 parts by weight, the silicone composition typically does not cure effectively, i.e., the silicone composition typically does not solidify into a cross-linked network. Similarly, when the (a) curable silicone resin is present in the silicone composition in an amount greater than 95 parts by weight, the silicone composition typically has an undesirable dimensional response to temperature change, i.e., a coefficient of linear thermal expansion (CTE) of greater than 200 ppm/° C. A suitable (a) curable silicone resin for the purposes of the subject invention includes commercially available hydrosilylation-curable silicone resins from Dow Corning Corporation of Midland, Mich.

The (b) inorganic particle of the subject invention has a polymeric surface coating formed thereon, as set forth in more detail below. The (b) inorganic particle is typically a metal oxide. The metal oxide is typically selected from $SiO_2$, $Al_2O_3$, $Al(OH)_3$, $ZrO_2$, $TiO_2$, $SnO_2$, and $GeO_2$, and combinations thereof. That is, the present invention is not limited to only silica-based inorganic particles, but rather may effectively include a wide range of non-silica-based inorganic particles, which is typically beneficial with respect to cost and availability considerations. In one embodiment, the (b) inorganic particle is a component of fumed silica.

Typically, the (b) inorganic particle is a component of colloidal silica. Colloidal silica is a dispersion of submicron-sized silica particles in an aqueous or other solvent medium. In particular, the (b) inorganic particle is typically silicon dioxide. The colloidal silica typically contains less than or equal to about 85, more typically 80 parts by weight of silicon dioxide based on 100 parts by weight of the colloidal silica.

The (b) inorganic particle typically has a particle size of less than 50 nm, more typically less than 20 nm, and most typically less than 15 nm. Although the shape of the (b) inorganic particle is not critical, inorganic particles having a spherical shape typically impart a smaller increase in viscosity to the silicone composition than particles having other shapes.

The (b) inorganic particle typically has a pH value at room temperature, i.e., 20 to 25° C., of from 3 to 9, more typically from 6 to 9. The pH value of the (b) inorganic particle can be determined by measuring the pH value of a slurry of 10 g of the (b) inorganic particle in 10 mL of distilled water, as set forth in ASTM D4792. When the pH value of the (b) inorganic particle is less than about 3, the silicone composition when cured typically exhibits reduced thermal stability, and may therefore be unsuitable for applications exposed to temperature changes. When the pH value of the (b) inorganic particle is greater than about 9, the silicone composition typically becomes unstable upon storage and/or exhibits reduced thermal stability when cured.

The (b) inorganic particle typically has a water content of less than 2% by weight, more typically less than 1% by weight based on 100 parts of the (b) inorganic particle. The water content of the (b) inorganic particle can be determined by measuring a weight loss on drying the (b) inorganic particle at 110° C., as set forth in ASTM D2216. In particular, in the embodiment where the (a) curable silicone resin is a hydrosilylation-curable silicone resin, if the water content of (b) is greater than about 2% by weight, the water and organohydrogensiloxane can react in the presence of the hydrosilylation catalyst. This reaction consumes the organohydrogensiloxane required for curing the silicone composition and produces hydrogen gas, which may cause formation of undesirable voids in the silicone composition upon curing.

The (b) inorganic particle is typically present in the silicone composition in an amount of from 5 to 95, more typically 40 to 95, and most typically 50 to 80 parts by weight based on 100 parts by weight of the silicone composition. That is, the (b) inorganic particle may be present in the silicone composition at a wide weight percent range without affecting the transparency of the silicone composition when cured. It is believed that the (b) inorganic particle may be present at such a wide weight percent range because the (a) curable silicone resin and the polymeric surface coating of (b) are compatible, e.g., because $R^1$ is compatible with a functionality of the polymeric surface coating, and because the polymeric surface coating of (b) is typically formed in-situ, as set forth in more detail below. However, at less than 5 parts by weight of the (b) inorganic particle reinforcement of the silicone composition is undesirable. In addition, at greater than 95 parts by weight of the (b) inorganic particle, the silicone composition typically exhibits a transparency of less than 80% in the wavelength of from 300 nm to 800 nm, i.e., the visible spectrum, when cured. A suitable (b) inorganic particle for the purposes of the subject invention includes Nalco 1330®, commercially available from Nalco of Naperville, Ill.

The polymeric surface coating formed on the (b) inorganic particle comprises an organopolysiloxane, as set forth in more detail below. The organopolysiloxane comprises units selected from $R^2_3SiO_{1/2}$, $R^2_2SiO_{2/2}$, $R^2SiO_{3/2}$, and combinations thereof. That is, according to general nomenclature known in the art, the organopolysiloxane comprises units selected from M units, i.e., monofunctional units; D units, i.e., difunctional units; T units, i.e., trifunctional units; and combinations thereof.

$R^2$ is selected from an aryl group, an alkyl group, an alkenyl group, hydrogen, and combinations thereof. Suitable aryl groups include phenyl, tolyl, xylyl, and naphthyl. Suitable alkyl groups include methyl, ethyl, propyl, isopropyl, n-butyl, isobutyl, and pentyl. Suitable alkenyl groups include vinyl, allyl, and propenyl. It is to be appreciated that other aryl groups, alkyl groups, and alkenyl groups not recited herein may also be suitable for the purposes of the subject invention.

$R^1$ equals $R^2$ such that when $R^1$ is the aryl group, $R^2$ is also the aryl group. Further, when $R^1$ is the alkyl group, $R^2$ is also the alkyl group. When $R^1$ is the alkenyl group, $R^2$ is also the alkenyl group, and when $R^1$ is hydrogen, $R^2$ is also hydrogen. That is, $R^1$ equals $R^2$ so that the (a) curable silicone resin and the polymeric surface coating of the (b) inorganic particle are compatible and have similar refractive index values. For example, when $R^1$ is a phenyl group so that the (a) curable silicone resin is a phenyl-based resin, $R^2$ is also a phenyl group so that the polymeric surface coating of the (b) inorganic particle is phenyl-functionalized. Therefore, the (b) inorganic particle is compatible with one or more components in the silicone composition, which contributes to adequate mixing and reinforcement of the silicone composition. Further, it is believed that because $R^1$ equals $R^2$, the composite article 10 has a desirable transparency, i.e., a transparency of greater than or equal to 80%, more typically greater than or equal to 85%, and most typically greater than equal to 90% in the wavelength of 300 nm to 800 nm, i.e., the visible spectrum. In particular, when $R^1$ does not equal $R^2$ so that the (a) curable silicone resin and the polymeric surface coating of the (b) inorganic particle are not compatible and do not have similar refractive index values, the composite article 10 typically has an undesirable transparency, i.e., a hazy appearance, in the wavelength of 300 nm to 800 nm. It is believed that when $R^1$ does not equal $R^2$, differences in refractive index values of the (a) curable silicone resin and the polymeric surface coating of the (b) inorganic particle in the silicon composition contribute to a hazy appearance of the silicone composition when cured. Conversely, when $R^1$ equals $R^2$, $R^1$ and $R^2$ have a similar refractive index value, i.e., the difference between the refractive index of $R^1$ and the refractive index of $R^2$ is less than 0.03, which contributes to the excellent transparency of the silicone composition when cured.

In one embodiment, when $R^1$ is an aryl group, the organopolysiloxane and/or the (a) curable silicone resin may further comprise an alkenyl group. That is, although $R^1$, and therefore $R^2$, are aryl groups, the organopolysiloxane may further comprise an alkenyl group. Similarly, although $R^1$ and $R^2$ are aryl groups, the (a) curable silicone resin may further comprise an alkenyl group. Likewise, although $R^1$ and $R^2$ are aryl groups, both the organopolysiloxane and the (a) curable silicone resin may further comprise an alkenyl group. Suitable alkenyl groups include those set forth above.

In another embodiment, when $R^1$ is an alkenyl group, the organopolysiloxane and/or the (a) curable silicone resin may further comprise an aryl group. That is, although $R^1$, and therefore $R^2$, are alkenyl groups, the organopolysiloxane may further comprise an aryl group. Similarly, although $R^1$ and $R^2$ are alkenyl groups, the (a) curable silicone resin may further comprise an aryl group. Likewise, although $R^1$ and $R^2$ are alkenyl groups, both the organopolysiloxane and the (a) curable silicone resin may further comprise an aryl group. Suitable aryl groups include those set forth above.

In the embodiments set forth above, the aryl groups and alkenyl groups may be in any suitable molecular position, but are typically at a terminal position to afford excellent compatibility between (a) and the polymeric surface coating of (b) and to impart (a) and the polymeric surface coating of (b) with similar refractive index values.

The organopolysiloxane may comprise any number of Si—O bonds. The organopolysiloxane may be formed from, for example, a disiloxane, a trisiloxane, a polysiloxane, and/or a polysilsesquioxane. In addition, the organopolysiloxane may be formed from a cyclosiloxane and/or an acyclic siloxane. Cyclosiloxanes and acyclic siloxanes typically have from 3 to 12, more typically from 3 to 10, and most typically from 3 to 6 silicon atoms. It is to be appreciated that the organopolysiloxane may be formed from any combination of the siloxanes set forth above.

In particular, the organopolysiloxane is typically formed from an organosilane, such as an alkoxysilane. It is to be appreciated that the organopolysiloxane may be formed from a blend of organosilanes, i.e., two or more different types of organosilanes. For example, the organopolysiloxane may be formed from one or more alkoxysilanes each having three alkoxy groups and one or more alkoxysilanes each having two alkoxy groups. In addition, it is to be appreciated that each alkoxy group may comprise a different number of carbon atoms. When the organosilane is the alkoxysilane, suitable alkoxysilanes for the purposes of the present invention include, but are not limited to, methoxysilanes and ethoxysilanes. The organosilane from which the organopolysiloxane is formed is typically selected from a phenyltrialkoxysilane, a vinyltrialkoxysilane, and combinations thereof. For example, the organosilane may be selected from phenyltrimethoxysilane, vinyltrimethoxysilane, and combinations thereof.

In one embodiment, the organopolysiloxane is formed from a phenyltrialkoxysilane and a vinyltrialkoxysilane. In this embodiment, the vinyltrialkoxysilane is typically utilized, i.e., reacted, in an amount of from 1 to 75, more typically 5 to 50, most typically 10 to 40 moles based on 100 moles of the phenyltrialkoxysilane. Without intending to be limited by theory, it is believed that the vinyltrialkoxysilane, when present in the aforementioned molar ratio, provides the composite article 10 with a transparency of greater than or equal to 80%, more typically greater than or equal to 85%, and most typically greater than or equal to 90% in the wavelength of 300 nm to 800 nm. In particular, when the vinyltrialkoxysilane is utilized in an amount greater than 75 moles based on 100 moles of the phenyltrialkoxysilane, the composite article 10 typically has an undesirable transparency, i.e., a hazy appearance, in the wavelength of 300 nm to 800 nm.

A suitable vinyltrialkoxysilane for the purposes of the present invention is vinyltrimethoxysilane, commercially available from Dow Corning Corporation of Midland, Mich. A suitable phenyltrialkoxysilane for the purposes of the present invention is phenyltrimethoxysilane, commercially available from Dow Corning Corporation of Midland, Mich.

The (c) cross-linking compound of the silicone composition is reactive with at least one of the (a) curable silicone resin and the polymeric surface coating of the (b) inorganic particle. Stated differently, the (c) cross-linking compound is reactive with one of the (a) curable silicone resin, the polymeric surface coating of the (b) inorganic particle, or both the (a) curable silicone resin and the polymeric surface coating of the (b) inorganic particle. The (c) cross-linking compound cross-links with $R^1$ and $R^2$, i.e., the aryl group, the alkyl group, the alkenyl group, and/or hydrogen, of the (a) curable silicone resin and the polymeric surface coating of the (b) inorganic particle to couple molecules and cure the silicone composition. For example, in the embodiment where the (a) curable silicone resin is a hydrosilylation-curable silicone resin, the (c) cross-linking compound typically comprises an organosilicon compound having at least two silicon-bonded hydrogen atoms. The organosilicon compound typically comprises units represented by the average formula

where $R^3$ is a substituted or unsubstituted monovalent hydrocarbon group that does not contain aliphatic unsaturation, b is a positive number that satisfies $0.7 \leq b < 2.1$, c is a positive number that satisfies $0.001 \leq c \leq 2.0$, and $0.8 \leq b+c < 2.5$. As used herein, the terminology "does not contain aliphatic unsaturation" means that the substituted or unsubstituted monovalent hydrocarbon group does not contain an aliphatic carbon-carbon double bond or carbon-carbon triple bond. Hydrocarbon groups represented by $R^3$ typically have from 1 to 18, more typically 1 to 6 carbon atoms, and may be branched or unbranched. Examples of hydrocarbon groups represented by $R^3$ include, but are not limited to, alkyl such as methyl, ethyl, propyl, and pentyl. Typically, $R^3$ is methyl. Suitable examples of substituents include, but are not limited to, —Cl, —Br, —I, —F, —$CO_2H$, —O(O=C)$CR^4$, wherein $R^4$ is a $C_1$ to $C_8$ hydrocarbyl. A suitable organosilicon compound for purposes of the present invention is phenyltris(dimethylsiloxy) silane, commercially available from Gelest Inc., of Tullytown, Pa.

The (c) cross-linking compound typically cross-links with at least one of (a) and the polymeric surface coating of (b) in the presence of a hydrosilylation catalyst. Stated differently, the (c) cross-linking compound typically cross-links with one of (a), the polymeric surface coating of (b), or both (a) and the polymeric surface coating of (b) in the presence of the hydrosilylation catalyst. The hydrosilylation catalyst can be any hydrosilylation catalyst known in the art such as, but not limited to, a platinum group metal, a compound containing a platinum group metal, or a microencapsulated platinum group metal-containing catalyst, as aforementioned. Typically, the platinum group metal is platinum, based on optimal activity of platinum in hydrosilylation reactions.

When the (c) cross-linking compound comprises the organosilicon compound, the silicon-bonded hydrogen atoms of the organosilicon compound typically react with unsaturated functional groups, e.g. vinyl groups, of at least one of the (a) curable silicone resin and the polymeric surface coating of the (b) inorganic particle. Stated differently, the silicon-bonded hydrogen atoms of the organosilicon compound of the (c) cross-linking compound typically react with unsaturated functional groups of one of (a), the polymeric surface coating of (b), or both (a) and the polymeric surface coating of (b). A molar ratio of the silicon-bonded hydrogen atoms of the organosilicon compound to the silicon-bonded alkenyl groups of the hydrosilylation-curable silicone resin is typically from 0.7 to 1.5:1, more typically 0.7 to 1.1:1. Molar ratios outside of the aforementioned range typically do not promote effective cross-linking and curing of the silicone composition.

The (c) cross-linking compound is typically present in the silicone composition in an amount of from 2 to 50, more typically 5 to 25 parts by weight based on 100 parts by weight of the silicone composition. When the (c) cross-linking compound is present in the silicone composition in an amount less than 2 or greater than 50 parts by weight, the silicone composition typically does not cure properly, i.e., the silicone composition typically does not solidify into a cross-linked network. Examples of suitable (c) cross-linking compounds for purposes of the present invention include, but are not limited to, 1,1,5,5-tetramethyl-3,3-diphenyltrisiloxane, phenyltris(dimethylhydrogensiloxy)silane, and 1,4-bis(dimethylsilyl)benzene, each of which is commercially available from Gelest Inc. of Tullytown, Pa.

Referring now to FIG. 1A, the composite article 10 of the subject invention comprises a substrate G and an adhesive silicone layer Si disposed adjacent to and in contact with the substrate G. The substrate G is formed from a vitreous material. The vitreous material is typically further defined as any material that is common to form windows or display panels for electronic devices. Specific examples of suitable vitreous materials that may be used to form the substrate G include common silica-based glass or a carbon-based polymer. However, it is to be appreciated that other vitreous materials not recited herein may also be suitable for the purposes of the subject invention. One specific example of a common silica-based glass is soda-lime-silica glass. Specific examples of carbon-based polymers that are suitable vitreous materials include, but are not limited to, polymethyl methacrylate (PMMA), polycarbonate, and polyetheretherketone.

The adhesive silicone layer Si is formed from the silicone composition of the subject invention. That is, the adhesive silicone layer Si is formed from the silicone composition comprising the (a) curable silicone resin, the (b) inorganic particle having the polymeric surface coating formed thereon, and the (c) cross-linking compound. As set forth above, the adhesive silicone layer Si is disposed adjacent to and in contact with the substrate G. In particular, the adhesive silicone layer Si may be shaped, for example, as a strip, a frame, or a sheet, and typically abuts and adheres to the substrate G. The adhesive silicone layer Si is typically useful for adhering layers, e.g. reinforcing layers, fire-resistant layers, additional substrates, etc., to the substrate G.

The composite article 10 typically has a transparency of greater than or equal to 80%, more typically greater than or equal to 85%, most typically greater than or equal to 90% in the wavelength from 300 nm to 800 nm, i.e., the visible spectrum, as measured in accordance with ASTM D1746-97. That is, unexpectedly, the composite article 10 is generally free from a hazy appearance, but rather allows light in the wavelength from 300 nm to 800 nm to pass through the composite article 10. Notably, the composite article 10 typically has a transparency of greater than or equal to 80%, more typically greater than or equal to 85%, and most typically greater than or equal to 90%, even when the silicone composition is filled to 70 to 95 parts by weight of the (b) inorganic particle based on 100 parts by weight of the silicone composition. It is believed that the compatibility of the (a) curable silicone resin and the polymeric surface coating of (b), e.g., the fact that $R^1$ equals $R^2$, provides the excellent transparency of the composite article 10 and allows for the presence of (b) in such high levels. As such, the composite article 10 and the silicone composition are typically useful for applications requiring excellent transparency, such as, fire-rated glass, electronic devices, photovoltaic devices, and encapsulation in optical devices.

Figure 1B:
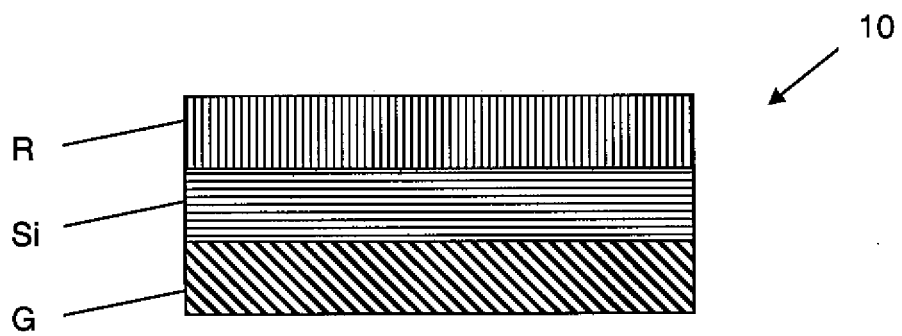
FIG. 1B is a cross-sectional view of a composite article comprising a substrate, an adhesive silicone layer, and an interlayer.

In another embodiment set forth in FIG. 1B, the composite article 10 may further comprise an interlayer R disposed adjacent to and in contact with the adhesive silicone layer Si. In this embodiment, the composite article 10 may be represented by the layer configuration G/Si/R, where G represents the substrate G, Si represents the adhesive silicone layer Si, and R represents the interlayer R as set forth in FIG. 1B. In particular, the interlayer R may be shaped, for example, as a strip, a frame, or a sheet, and typically abuts and adheres to the adhesive silicone layer Si. That is, the adhesive silicone layer Si is typically sandwiched between the substrate G and the interlayer R. The interlayer R is typically useful for imparting reinforcement or lamination to the substrate G, for example to minimize shattering. The interlayer R typically comprises polycarbonate, polyethylene, polyvinyl butyral, polytetrafluoroethylene, or combinations thereof. Most typically, the interlayer R is polycarbonate. In an application requiring excellent transparency, e.g., transparency greater than or equal to 80%, more typically greater than or equal to 85%, and most typically greater than or equal to 90% in the wavelength from 300 nm to 800 nm, it is preferable that the interlayer R does not detrimentally impede transparency. That is, the interlayer R is also typically transparent in the wavelength from 300 nm to 800 nm as measured in accordance with ASTM D1746-97.

Figure 1C:
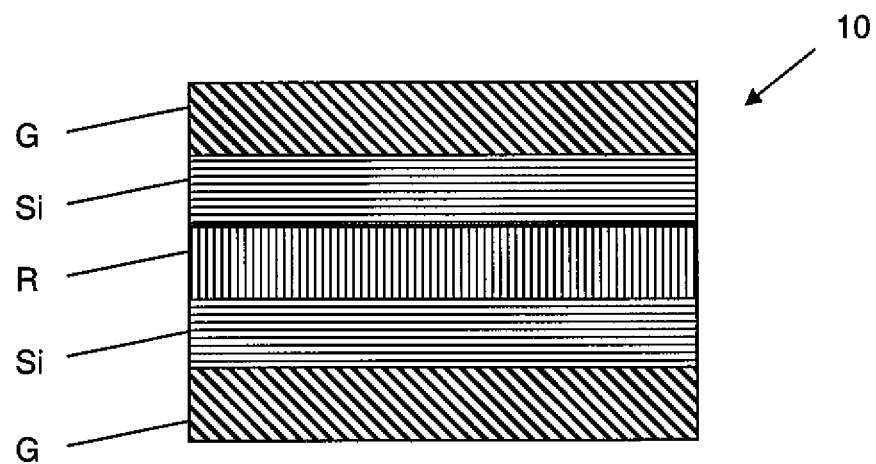
FIG. 1C is a cross-sectional view of a composite article comprising a substrate, an adhesive silicone layer, an interlayer, a second adhesive silicone layer, and a second substrate.

Referring to FIG. 1C, the composite article 10 may further comprise a second adhesive silicone layer Si and a second substrate G. The second adhesive silicone layer Si is typically disposed adjacent to and in contact with the interlayer R and formed from the silicone composition. It is to be appreciated that the second adhesive silicone layer Si is typically a separate layer, i.e., an additional layer, from the adhesive silicone layer Si set forth above, but that the second adhesive silicone layer Si is typically also formed from the silicone composition. The second adhesive silicone layer Si may be shaped, for example, as a strip, a frame, or a sheet, and typically abuts and adheres to the interlayer R. The second adhesive silicone layer Si is also typically useful for adhering layers, e.g. reinforcing layers, fire-resistant layers, additional substrates, etc., to the substrate G, second substrate G, and/or interlayer R.

The second substrate G is typically disposed adjacent to and in contact with the second adhesive silicone layer Si and formed from a second vitreous material. In particular, the second substrate G typically abuts and adheres to the second adhesive silicone layer Si. That is, the second adhesive silicone layer Si is typically sandwiched between the interlayer R and the second substrate G.

The second vitreous material is typically any of the suitable vitreous materials set forth above. It is to be appreciated that the second vitreous material and the vitreous material may be the same or different. For example, the vitreous material and the second vitreous material may be common silicate or silica-based glass, such as soda-lime glass. Or, the vitreous material may be common silicate or silica-based glass and the second vitreous material may be a carbon-based polymer. Alternatively, the second vitreous material may be common silicate or silica-based glass and the vitreous material may be a carbon-based polymer. In the embodiment including the second adhesive layer 18 and the second substrate G, the composite article 10 may be represented by the layer configuration G/Si/R/Si/G, where G represents the substrate G and the second substrate G, Si represents the adhesive silicone layer Si and the second adhesive silicone layer Si, and R represents the interlayer R, as set forth in FIG. 1C.

Unexpectedly, in this embodiment, the composite article 10 also typically has a transparency of greater than or equal to 80%, more typically greater than or equal to 85%, and most typically greater than or equal to 90% in the wavelength from 300 nm to 800 nm, as measured in accordance with ASTM D1746-97. That is, the composite article 10 including multiple layers is also generally free from a hazy appearance, but rather allows light in the wavelength from 300 nm to 800 nm to pass through the composite article 10. Notably, the composite article 10 typically has a transparency of greater than or equal to 80%, more typically greater than or equal to 85%, and most typically greater or equal to 90% even when the silicone composition is filled to greater than or equal to 70 parts by weight of the (b) inorganic particle based on 100 parts by weight of the silicone composition. Even for the embodiment comprising multiple layers of the adhesive silicone layer Si, e.g., the adhesive silicone layer Si, the second adhesive silicone layer Si, the interlayer R, the substrate G, and the second substrate G, it is believed that the compatibility of the (a) curable silicone resin and the polymeric surface coating of the (b) inorganic particle of the silicone composition, e.g., the fact that $R^1$ equals $R^2$, provides the excellent transparency of the composite article 10. As such, the composite article 10 of this embodiment is also useful for applications requiring excellent transparency.

Figure 1D:
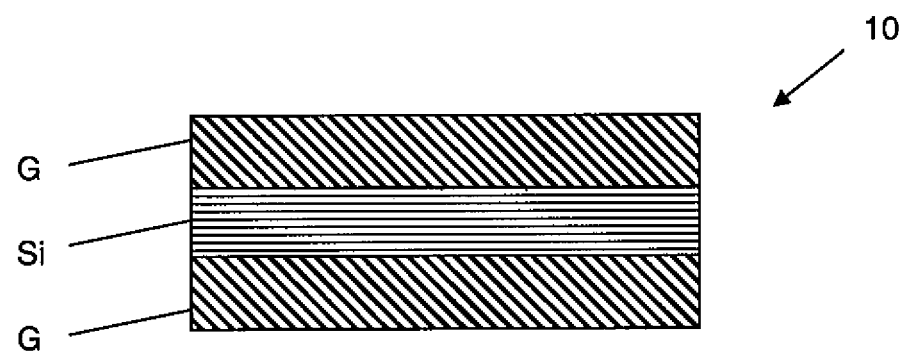
FIG. 1D is a cross-sectional view of a composite article comprising a substrate, an adhesive silicone layer, and a second substrate.
Figure 1E:
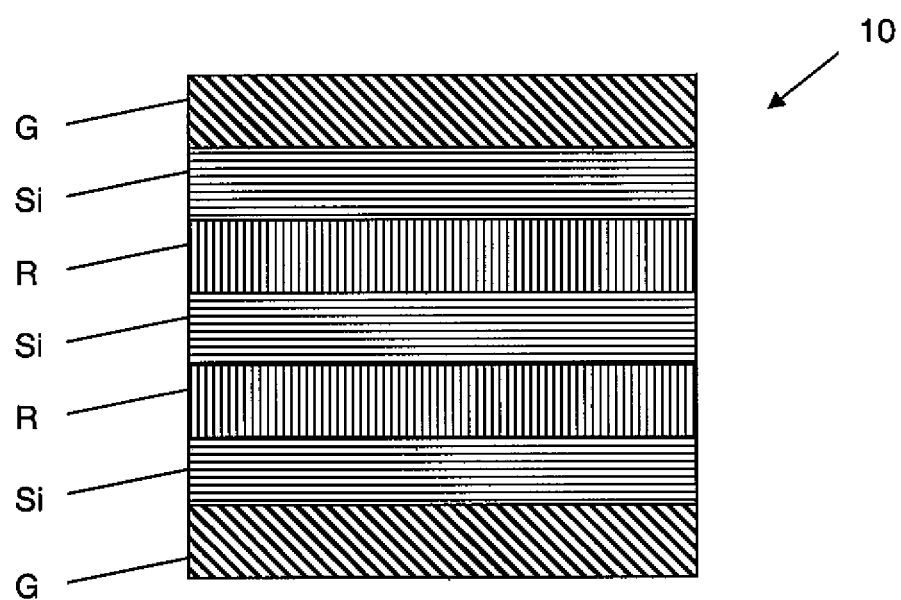
FIG. 1E is a cross-sectional view of a composite article comprising a substrate, multiple adhesive silicone layers, multiple interlayers, and a second substrate.

Referring to FIG. 1D, in yet another embodiment, the composite article 10 may further comprise the second substrate G disposed adjacent to and in contact with the adhesive silicone layer Si and formed from the second vitreous material. In this embodiment, the composite article 10 may be represented by the layer configuration G/Si/G, where G represents the substrate G and the second substrate G, and Si represents the adhesive silicone layer Si, as set forth in FIG. 1D. This particular embodiment is useful for applications requiring multiple substrates, such as, for example, multi-paned windows. In this embodiment, the composite article 10 also typically has a transparency of greater than or equal to 80%, more typically greater than or equal to 85%, and most typically greater than or equal to 90%, in the wavelength from 300 nm to 800 nm as measured in accordance with ASTM D1746-97.

It is to be appreciated that the composite article 10 of the subject invention is not limited to the aforementioned embodiments. Rather, an embodiment of the composite article 10 including, at a minimum, the substrate G and the adhesive silicone layer Si disposed adjacent to and in contact with the substrate G is contemplated and may be configured in multiple configurations, e.g. G/Si/R/Si/G as set forth in FIG. 1C; G/Si/R/Si/R/Si/G as set forth in FIG. 1E; etc. Further, the composite article 10 and silicone composition of the subject invention are not intended to be limited to only applications requiring reinforced or fire-resistant glass, but rather may be useful for applications including flexible displays, encapsulation in optical devices, photovoltaic devices, high-temperature packaging materials, adhesives, and coatings.

The method for preparing the silicone composition comprises the steps of providing the (a) curable silicone resin, providing the (b) inorganic particle, and providing the (c) cross-linking compound. Typically, each of components (a), (b), (c) are provided as an independent ingredient, i.e., as a separate, non-mixed reactant. In addition, when the organopolysiloxane is formed from the organosilane, or the blend of organosilanes, the organosilane is typically provided as an independent ingredient as well. It is to be appreciated that the (b) inorganic particle is initially typically provided without the polymeric surface coating formed thereon, i.e., as an untreated metal oxide. As described in greater detail below, the organopolysiloxane is typically formed form the organosilane in the presence of the (b) inorganic particle. The organosilane, which may be any suitable organosilane set forth above, is typically selected from alkoxysilanes, such as vinyltrialkoxysilanes, phenyltrialkoxysilanes, and combinations thereof.

The method also comprises the step of forming the polymeric surface coating comprising the organopolysiloxane on the (b) inorganic particle. As used herein, the terminology "forming" and "formed thereon" encompass both partial and complete covering of the (b) inorganic particle by the organopolysiloxane.

The polymeric surface coating typically coats the (b) inorganic particle. However, it is to be appreciated that the step of forming includes any suitable method for forming the polymeric surface coating on the (b) inorganic particle, such as, but not limited to, spray-coating (b), and forming the polymeric surface coating on (b) in-situ, e.g., via hydrolysis and condensation reactions.

The step of forming the polymeric surface coating may be further defined as polymerizing the organosilane to form the organopolysiloxane in the presence of the (b) inorganic particle. That is, in a typical embodiment, the polymeric surface coating is formed by polymerizing the organosilane to form the polymeric surface coating in-situ. In particular, the step of polymerizing typically comprises the step of hydrolyzing the organosilane to form a hydrolyzed silane in the presence of the (b) inorganic particle. Said differently, the organosilane undergoes a hydrolysis reaction to form the hydrolyzed silane in the presence of the (b) inorganic particle. As understood in the art, the hydrolyzed silane has hydroxyl functionality, i.e., at least one OH group.

To form the polymeric surface coating, the organosilane is typically combined with (b). More specifically, to effect the hydrolysis reaction of the organosilane, a solvent comprising water and an alcohol is typically added to the (b) inorganic particle to form a pre-reaction mixture. The organosilane is then typically added to the pre-reaction mixture to form a reaction mixture. The water is typically added to (b) in an amount of 1 to 5 parts by weight per 100 parts by weight of (b). Water may be added in liquid form or as steam. Additionally, the alcohol is typically added to (b) as a compatibilizer for the water and the organosilane, i.e., to situate the water and organosilane in one phase in the reaction mixture. As such, the alcohol is typically added to the water and (b) in a large quantity, e.g. in an amount of from 50 to 900, more typically from 100 to 300 parts by weight based on 100 parts by weight of (b). Suitable alcohols include, but are not limited to, isopropyl alcohol and butanol.

An acid catalyst is also typically added to the reaction mixture to catalyze the hydrolysis reaction. The acid catalyst may be any acid catalyst known in the art, such as hydrochloric acid, sulfuric acid, acetic acid, and the like. The acid catalyst is typically added in an amount of 1 to 10 parts by weight per 100 parts of the organosilane. It is to be appreciated that when the (b) inorganic particle has a pH of less than 6 or greater than 8, the acid catalyst is not required to catalyze the hydrolysis reaction.

Agitation of the reaction mixture of the (b) inorganic particle, water, and the alcohol at about 500 rpm for a batch size of 2 liters typically causes the hydrolysis reaction of the organosilane. Stated differently, the organosilane hydrolyzes to form the hydrolyzed silane. In particular, the reaction mixture is typically agitated at a temperature of from 60 to 120° C. for a time of from 1 to 5 hours so that the hydrolysis reaction reaches equilibrium. The reaction mixture of the (b) inorganic particle, water, and the alcohol forms the hydrolyzed silane, with alcohol being a byproduct of the hydrolysis reaction.

The step of polymerizing the organosilane typically further comprises the step of condensing the hydrolyzed silane in the presence of the (b) inorganic particle to form the organopolysiloxane. Said differently, the hydrolyzed silane typically condenses and deposits onto the (b) inorganic particle to form the polymeric surface coating via a condensation reaction in-situ. The condensation reaction forms the organopolysiloxane from the hydrolyzed silane with water as a by-product. The condensation reaction typically occurs under agitation at a temperature of 60 to 120° C. Termination of the condensation reaction may be effected by increasing the temperature to above 150° C. The resulting polymeric surface coating typically has a thickness of 0.05 μm on the (b) inorganic particle.

In contrast, inorganic particles treated with conventional organosilanes or organopolysiloxanes typically have a surface coating having a thickness of less than 0.015 μm. Therefore, the method for preparing the silicone composition typically provides the (b) inorganic particle with a uniform polymeric surface coating having excellent thickness. Further, based on such excellent thickness, the polymeric surface coating of the (b) inorganic particle typically has minimal voids in the polymeric surface coating. Therefore, it is believed that the steps of mixing components (a), (b), and (c) and the organosilane and forming the polymeric surface coating on (b), e.g., polymerizing the organosilane to form the polymeric surface coating in-situ, contributes to the excellent transparency of the composite article 10. That is, the minimal voids in the polymeric surface coating minimize light scattering, which contributes to a hazy appearance in the wavelength of 300 nm to 800 nm, i.e., the visible spectrum.

The method also comprises the step of mixing components (a), (b), and (c) to prepare the silicone composition. Components (a), (b), and (c) are typically mixed at about room temperature and agitated for about 5 minutes to prepare the silicone composition. The step of mixing allows contact between components (a), (b), and (c) in order to prepare the silicone composition. Specifically, the (a) curable silicone resin and the (c) cross-linking compound are typically added to the (b) inorganic particle having the polymeric surface coating formed thereon in the weight ratio set forth above to prepare the silicone composition. It is to be appreciated that once components (a), (b), and (c) are in contact, the silicone composition is prepared and is typically a cured, transparent resin, e.g. the adhesive silicone layer Si set forth above. That is, because of the compatibility of $R^1$ and $R^2$, e.g., because $R^1$ equals $R^2$, the (a) curable silicon resin is compatible with the polymeric surface coating formed on the (b) inorganic particle, and is cross-linked by the (c) cross-linking compound to form the adhesive silicone layer Si which can be used to form the composite article 10 having a transparency of greater than or equal to 80%, more typically greater than or equal to 85%, and most typically greater than or equal to 90% in the wavelength from 300 nm to 800 nm as measured in accordance with ASTM D1746-97.

The method of the subject invention advantageously provides for in-situ formation of the polymeric surface coating on the (b) inorganic particle, which results in excellent uniformity and a thicker surface coating as compared with existing methods. Further, in-situ formation of the polymeric surface coating allows for reduced production costs by way of fewer processing steps as compared with existing methods for preparing silicone compositions.

EXAMPLES

The following examples are intended to illustrate the invention and are not to be viewed in any way as limiting to the scope of the invention.

Measurement of Transparency

Transparency is expressed as a percentage of transmittance of light through a sample in the wavelength of 300 nm to 800 nm, i.e., the visible spectrum. The percent transmittance of the sample is measured using an XL-211 Hazegard Hazemeter equipped with a tungsten-halogen lamp in accordance with ASTM D1746-97.

Reference Example 1

An inorganic particle having a polymeric surface coating formed thereon is prepared. The inorganic particle is silica sol, commercially available from Nissan Chemical Industries, Ltd., of Tokyo, JP, which further comprises methanol. The silica sol has a mean particle size of 12 nm and a $SiO_2$ concentration of 30 percent by weight based on the total weight of the silica sol. 257 grams of the silica sol are disposed in a 2 liter glass reactor which is equipped with an agitator, a condenser, a thermometer, and two inlets. The silica sol is heated to 60° C. An organosilane comprising a combination of phenyltrimethoxysilane and vinyltrimethoxy silane is added over a period of time of 10 minutes to form a reaction mixture. The combination comprises 12.5 grams (0.063 moles) of the phenyltrimethoxysilane and 3.1 grams (0.021 moles) of the vinyltrimethoxysilane. The temperature of the reaction mixture is then raised to flash the methanol from the reaction mixture. 25.5 grams of n-butyl alcohol are added to maintain a volume of the reaction mixture. A distillate is collected while 190 grams of toluene are added to the reaction mixture over time to maintain the volume of the reaction mixture. When the temperature of the reaction mixture reaches 98° C., distillation is discontinued and the temperature of the reaction mixture is maintained at 95° C. for 4 hours. 90 grams of toluene are added to the reaction mixture, distillation commences, and the temperature of the reaction mixture is raised to 111° C., at which point the distillation is discontinued. A product including the inorganic particle having the polymeric surface coating formed thereon is formed. The product has a mass of 196 grams, of which 55 percent by weight of the product is $SiO_2$. The viscosity of the product is 3.6 MPa-s.

Reference Example 2

An adhesive silicone layer comprising a silicone composition is formed. 40 grams of silicone resin, 5 grams of 1,1,5,5-tetramethyl-3,3-diphenyltrisiloxane and 5 grams of phenyltris(dimethylhydrogensiloxy)silane are mixed with 136 grams of the inorganic particles having the polymeric surface coatings formed thereon, which were formed in Reference Example 1, to form a mixture. The mixture is heated to about 90 to 100° C. under reduced pressure to flash the toluene from the inorganic particles having the polymeric surface coatings formed thereon, which forms a silicon composition having a mass of 124 grams. The silicone composition is mixed with a catalyst such that the mixture comprises platinum in an amount of 5 ppm. The silicone composition is mixed in two consecutive cycles in a dental mixer for 30 seconds each. The silicon composition is then disposed on a first PET substrate having a length of 16 inches, a width of 16 inches, and a thickness of 75 µm via a spatula. A second PET substrate having the same dimensions is then disposed on the silicone composition such that the silicon composition is disposed between the first and second PET substrates. The first and second PET substrates, including the silicone composition disposed therebetween, are fed through a nip roller having a gap of 0.04 inches. The first and second PET substrates, including the silicone composition disposed therebetween, is heated at 130° C. for 8 minutes and then at 145° C. for 30 minutes to form the adhesive silicone layer. The first and second PET substrates, including the adhesive silicone layer disposed therebetween, are then cooled to room temperature, and the second PET substrate is peeled away. The adhesive silicone layer is peeled away from the first PET substrate and has a thickness of 2 mm. The adhesive silicone layer has a transparency of 90% at a wavelength of 300 nm and a transparency of 95% at 400 nm, as measured according to ASTM D1746-97.

Reference Example 3

A composite article is formed from the silicone composition of Reference Example 2. The silicone composition of Reference Example 2 is disposed on a glass substrate having a length of 150 mm, a width of 150 mm, and a thickness of 3.2 mm. The glass substrate, including the silicone composition disposed thereon, is heated at 130° C. for 8 minutes and then at 145° C. for 30 minutes to form the adhesive silicone layer. The glass substrate, including the adhesive silicone layer disposed therein, is then cooled to room temperature. The composite article has excellent transparency.

Reference Example 4

A fire-rated glass window comprising the silicone composition of Reference Example 2 is formed. The silicone composition of Reference Example 2 is disposed on a first glass substrate and a second glass substrate, each having a length of 150 mm, a width of 150 mm, and a thickness of 3.2 mm. The first and second glass substrates are then stacked such that the silicone composition is disposed between the first and second glass substrates. The first and second glass substrates, including the silicone composition disposed therebetween, are heated at 130° C. for 8 minutes and then at 145° C. for 30 minutes to form the adhesive silicone layer, thereby forming the fire-rated glass window. The fire-rated glass window is then cooled to room temperature. The fire-rated glass window has excellent transparency.

Comparative Example 5

A fire-rated glass window comprising a silicone composition is formed. The silicone composition is the silicone composition of Reference Example 2 but further comprising untreated colloidal silica. The fire-rated glass window is formed according to the steps set forth in Example 4, and the fire-rated glass window is opaque.

As illustrated by the Examples, the inorganic particle having the surface coating formed thereon imparts the adhesive silicone layer with excellent transparency, while alternatives, such as untreated colloidal silica, impart the adhesive silicone layer with opacity.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:
1. A silicone composition comprising:
 (a) a curable silicone resin comprising units having a functional group $R^1$ selected from the group consisting of an aryl group, an alkyl group, an alkenyl group, and hydrogen;
 (b) an inorganic particle having a polymeric surface coating formed thereon, said polymeric surface coating comprising an organopolysiloxane comprising units selected from the group consisting of $R^2_3SiO_{1/2}$, $R^2_2SiO_{2/2}$, $R^2SiO_{3/2}$, and combinations thereof, wherein $R^2$ is selected from the group consisting of an aryl group, an alkyl group, an alkenyl group, and hydrogen;

with the proviso that $R^1$ equals $R^2$, such that when $R^1$ is said aryl group, $R^2$ is also said aryl group;
when $R^1$ is said alkyl group, $R^2$ is also said alkyl group;
when $R^1$ is said alkenyl group, $R^2$ is also said alkenyl group; and
when $R^1$ is hydrogen, $R^2$ is also hydrogen; and
(c) a cross-linking compound reactive with at least one of (a) said curable silicone resin and said polymeric surface coating of (b) said inorganic particle;
wherein said polymeric surface coating and (a) said curable silicon resin have refractive index values within 0.03 of one another.

2. The silicone composition as set forth in claim 1 wherein $R^1$ is an aryl group.

3. The silicone composition as set forth in claim 2 wherein said organopolysiloxane and/or (a) said curable silicone resin further comprise an alkenyl group.

4. The silicone composition as set forth in claim 1 wherein $R^1$ is an alkenyl group.

5. The silicone composition as set forth in claim 4 wherein said organopolysiloxane and/or (a) said curable silicone resin further comprise an aryl group.

6. The silicone composition as set forth in claim 1 wherein (b) said inorganic particle is a metal oxide.

7. The silicone composition as set forth in claim 1 wherein (b) said inorganic particle has a particle size of less than 50 nm.

8. The silicone composition as set forth in claim 1 wherein (b) said inorganic particle is present in said silicone composition in an amount of 5 to 95 parts by weight based on 100 parts by weight of said silicone composition.

9. The silicone composition as set forth in claim 1 wherein said organopolysiloxane comprises the polymerization reaction product of an organosilane selected from the group consisting of a phenyltrialkoxysilane, a vinyltrialkoxysilane, and combinations thereof.

10. The silicone composition as set forth in claim 1 wherein said organopolysiloxane comprises the polymerization reaction product of a vinyltrialkoxysilane and a phenyltrialkoxysilane, and wherein said vinyltrialkoxysilane is reacted in an amount of 5 to 75 moles based on 100 moles of said phenyltrialkoxysilane.

11. The silicone composition as set forth in claim 1 wherein (a) said curable silicone resin is a hydrosilylation-curable silicone resin.

12. The silicone composition as set forth in claim 11 wherein said units of said hydrosilylation-curable silicone resin are represented by the average formula $R^1_a SiO_{(4-a)/2}$, 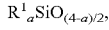

wherein $R^1$ is as defined above and a is a positive number that satisfies $0.5 \leq a < 2.5$, with the proviso that said hydrosilylation-curable silicone resin has at least two silicon-bonded alkenyl groups per molecule.

13. The silicone composition as set forth in claim 12 wherein (c) said cross-linking compound comprises an organosilicon compound having at least two silicon-bonded hydrogen atoms.

14. The silicone composition as set forth in claim 13 wherein said organosilicon compound comprises units represented by the average formula $R^3_b H_c SiO_{(4-b-c)/2}$, 

wherein $R^3$ is a substituted or unsubstituted monovalent hydrocarbon group that does not contain aliphatic unsaturation, b is a positive number that satisfies $0.7 \leq b < 2.1$, c is a positive number that satisfies $0.001 \leq c \leq 2.0$, and $0.8 \leq b+c < 2.5$.

15. The silicone composition as set forth in claim 13 wherein a molar ratio of said silicon-bonded hydrogen atoms of said organosilicon compound to said silicon-bonded alkenyl groups of said hydrosilylation-curable silicone resin is from 0.7 to 1.5:1.

16. The silicone composition as set forth in claim 1 wherein (a) said curable silicone resin is selected from the group consisting of a peroxide-curable silicone resin, a condensation-curable silicone resin, an epoxy-curable silicone resin, an ultraviolet radiation-curable silicone resin, and a high-energy radiation-curable silicone resin.

17. A composite article comprising:
a substrate formed from a vitreous material;
an adhesive silicone layer disposed adjacent to and in contact with said substrate and formed from a silicone composition comprising:
(a) a curable silicone resin comprising units having a functional group $R^1$ selected from the group consisting of an aryl group, an alkyl group, an alkenyl group, and hydrogen;
(b) an inorganic particle having a polymeric surface coating formed thereon, said polymeric surface coating comprising an organopolysiloxane comprising units selected from the group consisting of $R^2_3SiO_{1/2}$, $R^2_2SiO_{2/2}$, $R^2SiO_{3/2}$, and combinations thereof wherein $R^2$ is selected from the group consisting of an aryl group, an alkyl group, an alkenyl group, and hydrogen;
with the proviso that $R^1$ equals $R^2$, such that when $R^1$ is said aryl group, $R^2$ is also said aryl group;
when $R^1$ is said alkyl group, $R^2$ is also said alkyl group;
when $R^1$ is said alkenyl group, $R^2$ is also said alkenyl group; and
when $R^1$ is hydrogen, $R^2$ is also hydrogen; and
(c) a cross-linking compound reactive with at least one of (a) said curable silicone resin and said polymeric surface coating of (b) said inorganic particle.

18. The composite article as set forth in claim 17 having a transparency of greater than or equal to 80% in the wavelength from 300 nm to 800 nm as measured in accordance with ASTM D1746-97.

19. The composite article as set forth in claim 17 further comprising an interlayer disposed adjacent to and in contact with said adhesive silicone layer.

20. The composite article as set forth in claim 19 further comprising a second adhesive silicone layer and a second substrate, wherein said second adhesive silicone layer is disposed adjacent to and in contact with said interlayer and is formed from said silicone composition, and wherein said second substrate is disposed adjacent to and in contact with said second adhesive silicone layer and is formed from a second vitreous material.

21. The composite article as set forth in claim 17 further comprising a second substrate disposed adjacent to and in contact with said adhesive silicone layer and formed from a second vitreous material.

22. A method for preparing a silicone composition, said method comprising the steps of:
(I) providing (a) a curable silicone resin comprising units having a functional group $R^1$ selected from the group consisting of an aryl group, an alkyl group, an alkenyl group, and hydrogen;
(II) providing (b) an inorganic particle;
(III) forming a polymeric surface coating comprising an organopolysiloxane on (b) the inorganic particle;

wherein said organopolysiloxane comprises units selected from the group consisting of $R^2_3SiO_{1/2}$, $R^2_2SiO_{2/2}$, $R^2SiO_{3/2}$, and combinations thereof, wherein $R^2$ is selected from the group consisting of an aryl, alkyl group, an alkenyl group, and hydrogen;

with the proviso that $R^1$ equals $R^2$, such that when $R^1$ is the aryl group, $R^2$ is also the aryl group;

when $R^1$ is the alkyl group, $R^2$ is also the alkyl group;

when $R^1$ is the alkenyl group, $R^2$ is also the alkenyl group; and when $R^1$ is hydrogen, $R^2$ is also hydrogen;

(IV) providing (c) a cross-linking compound reactive with at least one of (a) the curable silicone resin and the polymeric surface coating of (b); and (V) mixing components (a), (b), and (c) to prepare the silicone composition;

wherein said polymeric surface coating and (a) said curable silicon resin have refractive index values within 0.03 of one another.

23. The method as set forth in claim 22 wherein the step of forming the polymeric surface coating is further defined as polymerizing an organosilane to form the organopolysiloxane in the presence of (b) the inorganic particle.

24. The method as set forth in claim 23 wherein the step of polymerizing the organosilane comprises hydrolyzing the organosilane to form a hydrolyzed silane in the presence of (b) the inorganic particle.

25. The method as set forth in claim 24 wherein the step of polymerizing the organosilane comprises condensing the hydrolyzed silane to form the organopolysiloxane in the presence of (b) the inorganic particle.

\* \* \* \* \*